G. B. GRAY.
MECHANISM FOR TRAIN CONTROL SYSTEMS.
APPLICATION FILED MAY 16, 1912.
1,135,374.
Patented Apr. 13, 1915.
3 SHEETS—SHEET 1.
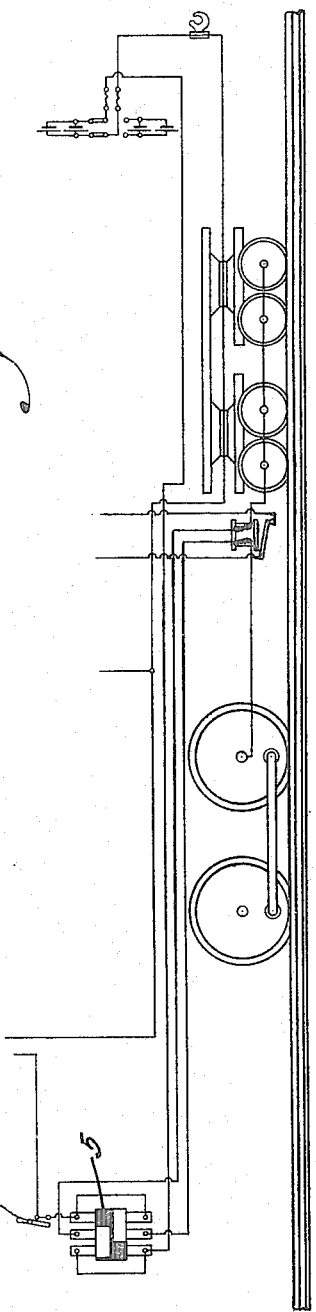
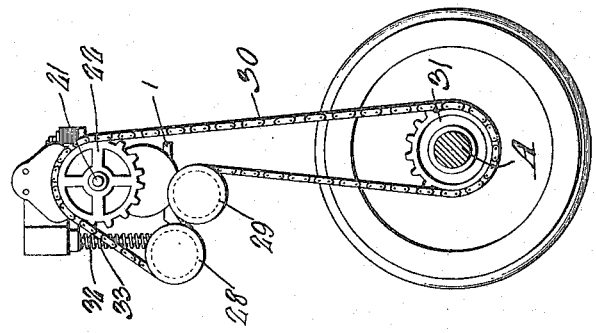
Gardner B. Gray Inventor
Witnesses
by
Attorneys G. B. GRAY.
MECHANISM FOR TRAIN CONTROL SYSTEMS.
APPLICATION FILED MAY 16, 1912.
1,135,374.
Patented Apr. 13, 1915.
3 SHEETS—SHEET 2.
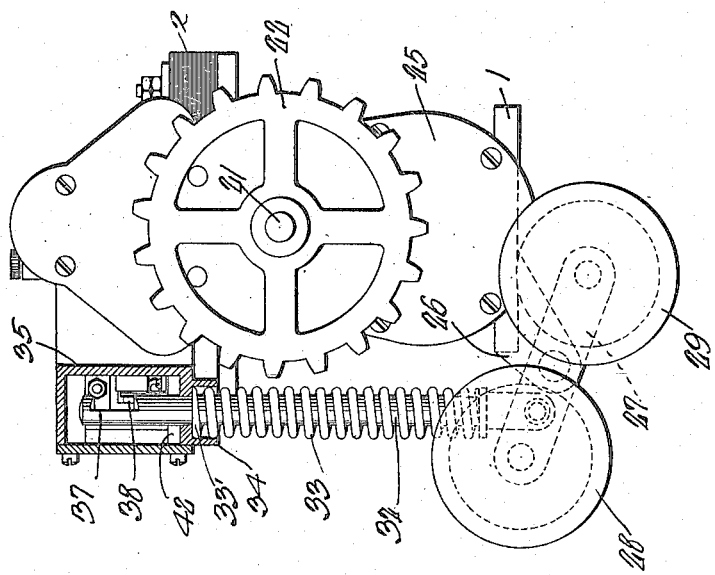
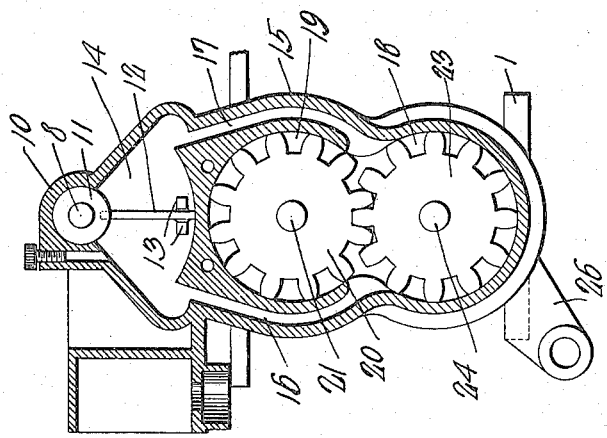
Witnesses
Gardner B. Gray  Inventor
by  Attorneys

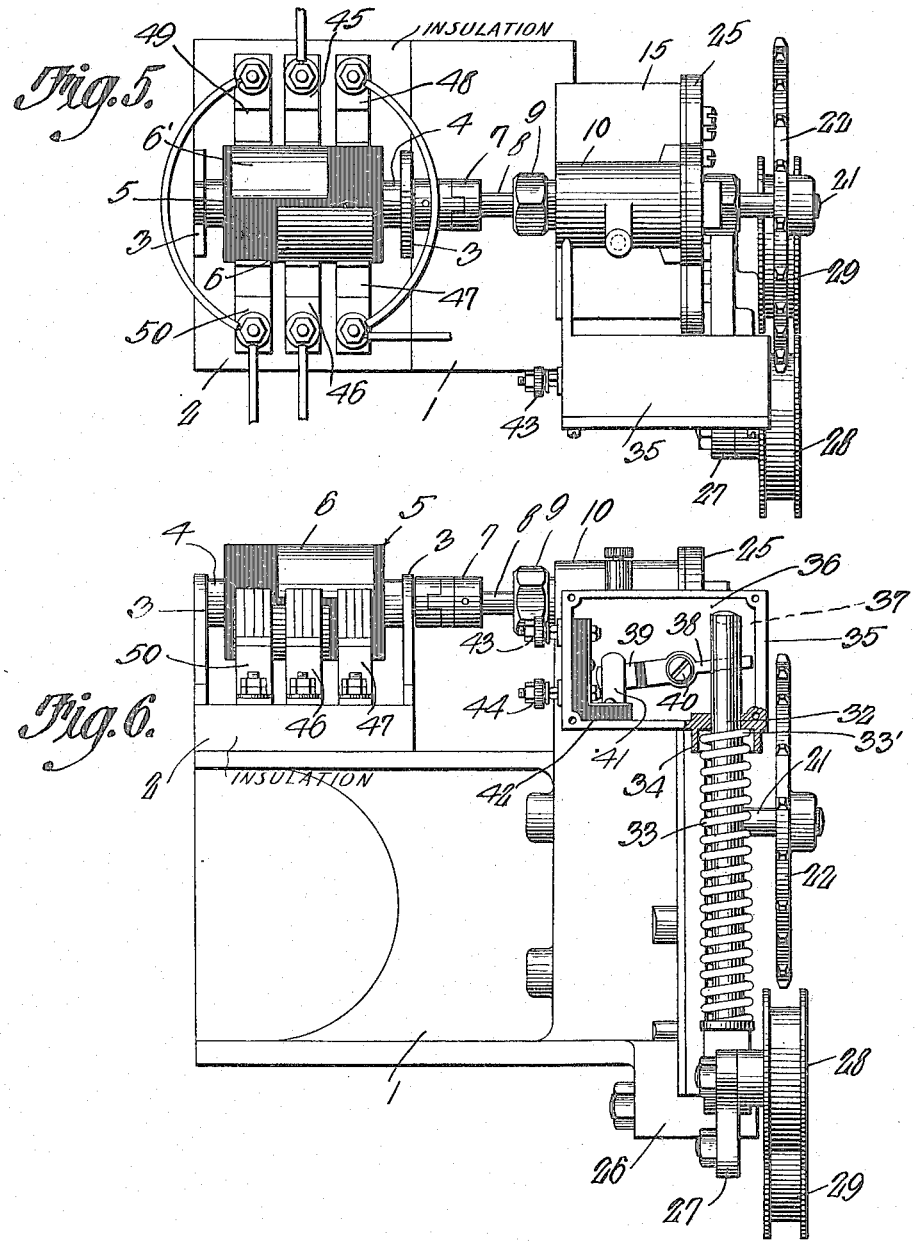

UNITED STATES PATENT OFFICE.

GARDNER B. GRAY, OF PITTSBURGH, PENNSYLVANIA, ASSIGNOR, BY MESNE ASSIGNMENTS, TO AUTOMATIC TRAIN CONTROL & SIGNAL COMPANY, OF PITTSBURGH, PENNSYLVANIA, A CORPORATION OF DELAWARE.

MECHANISM FOR TRAIN-CONTROL SYSTEMS.

1,135,374.  Specification of Letters Patent.  Patented Apr. 13, 1915.

Application filed May 16, 1912. Serial No. 697,726.

*To all whom it may concern:*

Be it known that I, GARDNER B. GRAY, a citizen of the United States, residing at Pittsburgh, in the county of Allegheny and State of Pennsylvania, have invented a new and useful Mechanism for Train-Control Systems, of which the following is a specification.

The present invention relates to an improved polarity reversing device for train control system.

In the Patent No. 909,083, a train controlling system is shown having a normally closed charged circuit. When it is desired to transmit a caution signal into the car, a master battery of the track circuit is placed in series with the battery of a car circuit. In order to properly carry out this operation it is necessary that both the car and the master batteries have their positive and negative poles placed against each other with a certain relation so that the master battery may affect the car battery in such a way as to allow the caution signal to be transmitted into the car circuits.

The main object of the present invention is to provide means whereby the polarity of the current in the car circuit may be automatically reversed in accordance with the direction of movement of the train, so that the current of the car battery may always be of proper polarity in reference to the track battery and the master battery so as to effect the proper indication of the caution signal into the car circuits, as fully set forth in the above patent.

A further object of this invention is to provide means for automatically rupturing the car circuit in case the current thereof is not automatically reversed in accordance with the direction of travel of the car.

In accordance with the above, the invention resides in the arrangement of parts, features of construction, and combination of elements hereinafter set forth in the claims, it being understood that the description and drawings merely show one preferred embodiment of the invention.

In the drawings:—Figure 1 is a view in elevation of the present mechanism operably connected to the axle of a car. Fig. 2 is an electrical diagram showing the position of the reversing switch and the cut out switch in an electrical train control system. Fig. 3 is an end elevation of the complete mechanism with a section taken through the cut out switch casing. Fig. 4 is a section through the motor or casing showing the paddle of the reversing switch in neutral position. Fig. 5 is a top plan view of the complete reversing switch mechanism. Fig. 6 is a view taken from the left side as shown in Fig. 3.

Referring to the drawings, the numeral 1 designates the casting or support for the complete reversing and cut out switch and carries upon the upper portion thereof the block 2 of insulation for supporting the two post journals 3 for the shaft 4, said shaft 4 carrying the cylinder 5 which is composed of metal contacts 6 and 6' embedded in a body of insulation. Connected to the shaft 4 is a clutch member 7 mounted upon the shaft 8, said shaft 8 being projected through the stuffing box 9 into the casing 10. Upon the shaft 8 within the casing 10 is a sleeve 11 which has depending therefrom the paddle or blade 12 provided with the oppositely disposed limiting projections 13. This paddle 12 is free to move within the segmental chamber 14 formed in the upper end and at one side of the main casting 1.

A casing 15 is formed at the same end of the casting 1 with the casing 10 and is provided with the oppositely disposed channels 16 and 17 which provide communicating means between the respective sides of the segmental chamber 14 and the lower rotor chamber 18. A chamber 19 is also provided intermediate of the casing 15 above the chamber 18 and has mounted therein a toothed rotor 20 keyed upon the shaft 21 which projects exterior of the casing 15 and carries the sprocket wheel 22. The toothed rotor 20 is in engagement at all times with the lower toothed rotor 23 journaled upon the shaft 24 concentrically of the casing 18. By this means the rotation of the sprocket 22 will rotate the toothed rotor 20 and consequently the toothed rotor 23, the direction of rotation of the lower toothed rotor 23 imparting the desired circulation of the oil or other non-freezing fluid within the chambers of the casings 15 and 10, so that the same will be directed upwardly through either one of the channels 16 or 17 and consequently move the blade 12 to the right or left as viewed in Fig. 4, so as to rotate the shaft 8 and through the clutch 7, the shaft 4 carrying the reversing switch drum 5. As the sprocket wheel 22 may be rotated in both directions, it is evident that the direction of flow of the oil in the respective channels 16 and 17 may be changed due to the direction of rotation of the sprocket 22, and consequently that the blade 12 may be oscillated to impart the desired reversing movement to the reversing switch drum 5.

A cover 25 is provided for incasing the respective rotor chambers, the channels 16 and 17 and also the upper chamber 14 of the casing 10.

A journal box 26 is formed integral with the casting 1 and has mounted therein intermediate of its ends the rocking arm 27, which has journaled in each of its respective ends the two idlers 28 and 29, which are disposed to receive the sprocket chain 30, which as shown in Fig. 1, is trained around the sprocket wheel 31 mounted upon the car axle A so that the rotation of the car axle will impart the desired rotation to the sprocket 22 and consequently to the rotors.

In order to provide a means whereby should the chain 30 break and thereby permit of the improper closure of the reversing switch, the rod 32 has its lower end pivoted to the rocking arm 27 and has disposed thereupon the spring 33 whose upper end 33' is fitted within the cupped portion 34 of the cut out knife switch casing 35. The spring exerts a tension in opposition to the pulling strain of the chain 30, so that should the chain break, the idler 28 will be moved downwardly so that the upper end of the rod 32 within the chamber 36 of the knife switch casing 35, will be pressed downwardly. The inner end of the rod 32 is slotted as at 37 for the reception of the outer end 38 of the switch 39, which is pivoted at 40 within the chamber 36 of the casing 35. Two terminal plates 41 are disposed within the casing 36 and are carried by the block 42 of insulation and have led therefrom the respective terminal posts 43 and 44.

Carried upon the block 2 of insulation upon opposite sides of the cylinder 5 of the reversing switch are the spring contact plates 45, 46, 47, 48, 49 and 50 all of which are disposed for coactive relation with the metal contact plates 6 and 6' of the cylinder 5.

As shown in diagram, Fig. 2, the cylindrical body 5 and the respective spring contact plates engaging the same are mounted in the electrical circuit, so that the polarity of the circuit is changed due to the direction of travel of the sprocket wheel 22, the sprocket wheel 22 as before described agitating the body of fluid within the chambers so as to oscillate the paddle 12 in the desired direction to control and hold the cylinder 5 so that the proper contacts are made for causing the current to flow in the desired direction. It will also be noted that the switch 39 which is a simple form of knife switch, will normally be closed when the sprocket chain 30 is in the proper position, and should the same become abnormally stretched or broken, the spring 33 will actuate said switch to open the circuit at said point and thus provide a danger indication in the signal system. This feature is very desirable, for the reason that the polarity of the current in the signaling system must be changed according to the direction of travel of the car, and should the chain 30 break or become so loose as to make the rotation of the sprocket wheel 22 ineffective, the necessary change in the polarity in the current would not be made. Therefore in order to avoid this the switch 39 has been provided.

What is claimed is:—

1. A polarity reversing device for train control systems comprising: a normally closed charged car circuit, polarity reversing means in said circuit, and means for automatically operating said reversing means when the direction of movement of the car is reversed, and automatic means for rupturing the car circuit when the automatic reversing means fail to operate.

2. The combination with a car carried normally closed signal circuit, of a reversing switch therein, and means for operating the switch from the running gear of the car, said means having a rotor casing, a paddle casing in communication therewith, a paddle mounted in the casing for oscillatory movement, said paddle being connected to the reversing switch, and a rotor mounted in the rotor casing and operably connected to the running gear of the car.

3. The combination with a car carried normally closed signal circuit, of a reversing switch therein, and means for operating the switch from the running gear of the car, said means having a rotor casing a paddle casing in communication therewith, a paddle mounted in the casing for oscillatory movement, said paddle being connected to the reversing switch, and a rotor mounted in the rotor casing and operably connected to the running gear of the car, whereby the direction of travel of the car regulates the position of the reversing switch and the consequent polarity of the current.

4. The combination with a car, a car carried normally closed signal circuit therein, a reversing switch in said circuit, and a jaw switch in said circuit, and means for controlling said switches, comprising a casing, means mounted therein for controlling the direction of movement of the reversing switch, means for operating the last mentioned means, a chain connecting the last means to the axle, and means actuated by the abnormal stretching or the breakage of the chain for opening the jaw switch.

5. The combination with a car, a car carried normally closed signal circuit therein, a reversing switch in said circuit, and a jaw switch in said circuit, and means for controlling both switches, comprising a casing, a fluid actuated means mounted in the casing and connected to the reversing switch, means for agitating the fluid within the casing to move said fluid actuated means, a chain connected to said agitating means and to the axle of the car, and means controlled by the chain for actuating the jaw switch due to the breakage of the chain.

6. The combination with a car, a car carried normally closed signal circuit therein, a reversing switch in said circuit, and a jaw switch in said circuit, and means for controlling both switches, comprising a casing, a fluid actuated means mounted in the casing and connected to the reversing switch, means for agitating the fluid within the casing to move said fluid actuated means, a chain connected to said agitating means and to the axle of the car, two idlers over which the chain is trained, and means connected to said idlers and the jaw switch for opening the jaw switch due to the breakage of the chain.

7. The combination with a car, a car carried normally closed signal circuit therein, a reversing switch in said circuit, and a jaw switch in said circuit, and means for controlling both switches, comprising a casing, a fluid actuated means mounted in the casing and connected to the reversing switch, means for agitating the fluid within the casing to move the fluid actuated means, a chain connected to said agitating means and to the axle of the car, and a double arm pivoted intermediate its ends to the casing, an idler disposed in each free end of the arm and over which the chain is trained, a rod connected to one end of the double arm and to the jaw switch, and a spring mounted upon said rod for actuating the same to open the jaw switch upon the breakage of the chain.

8. A polarity reversing device for train control systems comprising: a normally closed charged car circuit, a reversing switch in said circuit, transmission mechanism connected to the running gear of the car and controlling the position of the reversing switch, whereby the direction of travel of the car regulates the polarity of the current of the circuit, and automatic means for rupturing the car circuit when the transmission mechanism fails to operate.

9. A polarity reversing device for train control systems comprising: a normally closed charged car circuit, a reversing switch in said circuit, transmission mechanism connected to the running gear of the car and controlling the position of the reversing switch, a cut out switch also in said circuit, connections from said transmission mechanism to said cut out switch adapted to hold the latter closed irrespective of the direction of movement of said transmission mechanism, and automatic means for opening said cut out switch when the transmission mechanism fails to operate.

10. A polarity reversing device for train control systems comprising: a normally closed charged car circuit, a fluid actuated reversing switch in said circuit, and means operated from the running gear of the car for actuating said fluid.

11. A train controlling device comprising: a car, a circuit passing through said car, a switch in said circuit, means normally tending to move the switch to open the circuit, and driving connections controlled by the movement of the car for normally restraining said means from acting and permitting them to act when the driving connections are ruptured.

12. A train controlling device comprising: a car, a train controlling appliance carried thereby, a circuit passing through said car, a switch in said circuit, means normally tending to move the switch to open the circuit, driving connections controlled by the movement of the car, for operating the appliance, normally restraining the said means from acting and permitting them to act when the driving connections are ruptured.

In testimony that I claim the foregoing as my own, I have hereto affixed my signature in the presence of two witnesses.

GARDNER B. GRAY.

Witnesses:
 JOSEPH KNOX STONE,
 GUY P. THURBER.

Copies of this patent may be obtained for five cents each, by addressing the "Commissioner of Patents, Washington, D. C."